United States Patent [19]
Obata et al.

[11] 4,387,759
[45] Jun. 14, 1983

[54] PNEUMATIC RADIAL TIRE

[75] Inventors: Kazuo Obata; Yutaka Yamaguchi; Kojirou Yamaguchi; Akio Sato, all of Higashimurayama, Japan

[73] Assignee: Bridgestone Tire Company Limited, Tokyo, Japan

[21] Appl. No.: 308,644

[22] Filed: Oct. 5, 1981

[30] Foreign Application Priority Data

Oct. 16, 1980 [JP] Japan ............................... 55-143687

[51] Int. Cl.³ .................... B60C 15/06; B60C 9/08
[52] U.S. Cl. ............................ 152/353 R; 152/354 R; 152/356 R; 152/362 CS; 152/362 R
[58] Field of Search ......... 152/362 R, 362 CS, 353 R, 152/353 C, 353 G, 354–356

[56] References Cited
U.S. PATENT DOCUMENTS 4,086,948  5/1978  Suzuki et al. ................. 152/362 CS
4,289,184  9/1981  Motomura et al. ........... 152/362 CS

FOREIGN PATENT DOCUMENTS 55-106806  8/1980  Japan ........................... 152/362 CS
55-110606  8/1980  Japan ........................... 152/362 CS
1433353    4/1976  United Kingdom ......... 152/362 CS Primary Examiner—Jerome W. Massie
Assistant Examiner—Lois E. Boland
Attorney, Agent, or Firm—Sughrue, Mion, Zinn, Macpeak and Seas

[57] ABSTRACT

A pneumatic radial tire having a sandwiched structure formed by embracing side rubber between rubber filler and rubber chafer in the bead portion is disclosed. The tire has a high stiffness in the bead portion and has very excellent durable life.

2 Claims, 2 Drawing Figures

PNEUMATIC RADIAL TIRE

BACKGROUND OF THE INVENTION

1. Field of the Invention

The present invention relates to a pneumatic radial tire. More particularly it relates to an improvement of the bead portion of pneumatic radial tire for a passenger car.

2. Description of the Prior Art

Radial tires have a carcass consisting of a small number of plies, for example, generally one ply or at most two plies, due to the particular carcass structure wherein reinforcing cords are arranged in the radial direction. Therefore, each end portion of the carcass ply is turned up in one direction around a bead wire and terminates in the bead portion. Consequently, the bead portion, in which the turn-up end of the carcass ply is located, is much higher in the stiffness than the side portion due to the difference in the number of plies. Consequently stress is concentrated to the turn-up end of the carcass ply, in which the stiffness changes suddenly, to cause early failures, such as separation and cracks, due to its deformation during the running of the tire.

In order to prevent the above described failures in the bead portion, there has hitherto been proposed a tire structure, wherein a tapered and relatively rigid rubber filler, extends from the upper portion of a bead wire towards the side portion of the tire beyond the above described turn-up end. The filler is arranged between the carcass and the turn-up portion thereof and a rubber chafer is sandwiched between the rubber filler and the lower end portion of a side rubber. As a result, the stiffness is gradually decreased from the bead portion towards the side portion.

However, when tires are exposed to severe running conditions, such as running speed, road surface condition and the like, for a long period of time, the above described structure is still insufficient. The turn-up end has to be additionally reinforced by a cord layer.

SUMMARY OF THE INVENTION

The present invention provides a pneumatic radial tire having a remarkably improved durability in its bead portion without the use of an additional cord reinforcement by a novel combination arrangement of rubber layers having different physical properties in the vicinity of the turn-up portion of carcass ply to disperse stress.

That is, a feature of the present invention is the provision of a pneumatic radical tire having a cylindrical tread portion, side portions located at both sides of the tread portion and extending inwardly in the radial direction, and bead portions located at the inner edge portions of the side portions and having a bead wire. The tread, side and bead portions are reinforced with a carcass consisting of at least one radially arranged-fiber cord layer and turned up around the bead wire from the inside to the outside. The turn-up end of the carcass is substantially terminated in the bead portion. The bead portion is reinforced by arranging a tapered rigid rubber filler between the carcass and the turn-up portion thereof to extend from the upper portion of the bead wire towards the side portion beyond the turn-up end of the carcass. This invention employs a covering for the side portion comprising a flexible side rubber located in the area extending from the side portion to the upper portion of the bead portion. A rigid rubber chafer is located in the area at least contacting with a rim flange when the tire is assembled on a rim, with the lower end of the side rubber embraced between the rubber chafer and the above described turn-up portion of the carcass.

In a preferred embodiment of the pneumatic radial tire of the present invention, the rubber of covering for the side portion has an annular stress-relaxing projections projected outwardly from the bead portion at the vicinity of the turn-up end of the carcass.

DESCRIPTION OF THE PREFERRED EMBODIMENT

Figure 1:
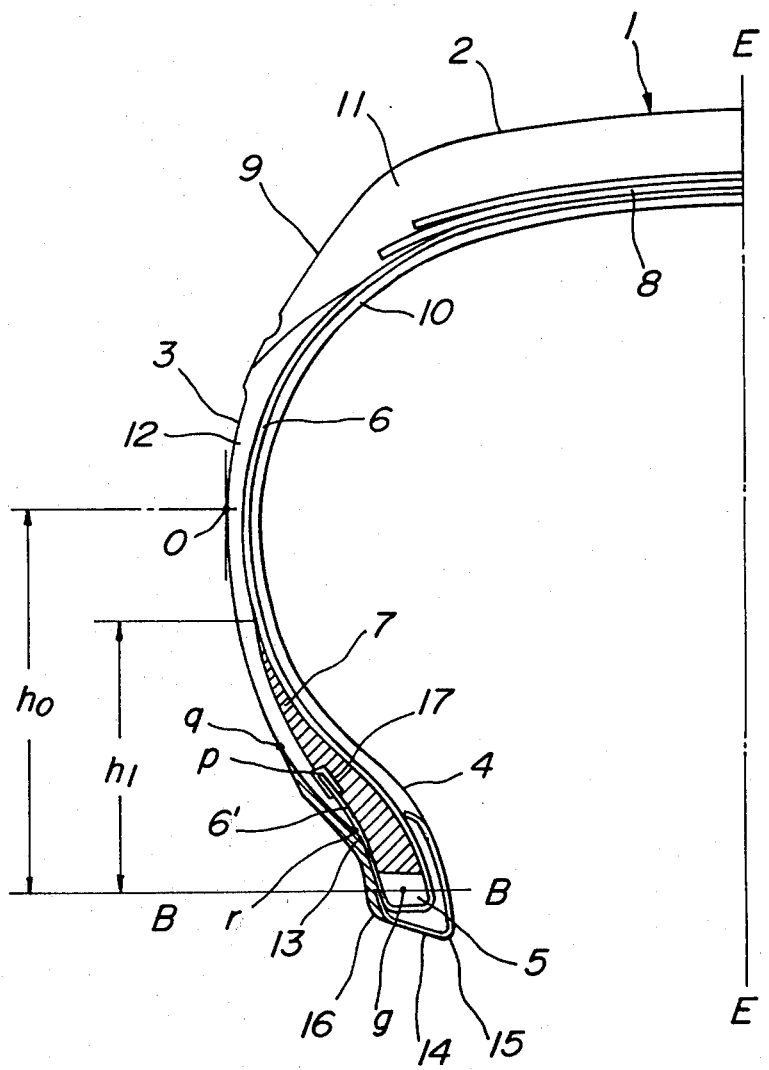
FIG. 1 is a cross-sectional view of the left half of one emodiment of the tire of the present invention.

The present invention will be explained in more detail referring to the drawings.

FIG. 1 is a cross-sectional view of one embodiment of the radial tire according to the present invention. Referring to FIG. 1, a tire 1 has a tread portion 2 having a cylindrical shape in its center portion and extending towards the circumferential direction of the tire, side portions 3 connected to both sides of the tread portion and extending radially towards the rotation axis of the tire, and bead portions 4 connected to the side portions 3. The tire is formed into a toroidal shape by the tread portion, side portions and bead portions. In FIG. 1, the right half of the cross-sectional shape of the tire is omitted in order to simplify the drawing. Of course, the cross-section of the tire 1 is symmetrical with respect to the equatorial plane shown by a straight line E—E.

The bead portion 4 is provided with a bead wire 5 as usual, and a carcass 6 extends between the bead wires arranged in the bead portions at both sides of the tire to reinforce the bead portions, side portions and tread portion.

The carcass 6 is made of a rubberized ply of fiber cords, such as polyester, nylon or rayon, which is arranged in a direction substantially perpendicular to the equatorial plane E—E of the tire, that is, in the so-called radial direction. Each end of the carcass 6 is turned up around the bead wire 5 from the inner side towards the outer side, and the turn-up portion 6' is substantially terminated in the bead portion 4. The use of one ply as the carcass 6 is exemplified in FIG. 1, but a plural number of plies can be used depending upon the elasticity and strength of the cord used and the intended use of the tire.

A tapered rigid rubber filler 7 is arranged between the carcass 6 and the turn-up portion 6' thereof to extend from the vicinity of the upper portion of the bead wire 5 towards the side portion 3 and to fill the space between the carcass 6 and the turn-up portion 6' thereof.

For the belt 8, a plural number of cord layers having inextensible cords, such as steel cords, are superposed such that the cords in the adjacent cord layers are crossed with each other at a small inclined angle with respect to the equatorial plane E—E of the tire. They are arranged around the carcass 6 to extend over substantially the entire width of the tread portion 2 according to conventional radial tires of this kind.

The outer and inner sides of the reinforcing layer for the carcass 6, rubber filler 7, belt 8 and the like are covered with an outer rubber layer 9 and an inner liner 10. The outer rubber layer 9 comprises a tread rubber 11 having high wear resistance and slipping resistance at the position of the tread portion 2, a flexible side rubber 12 having high flexural strength at the position of the side portion 3 and a rigid rubber chafer 13 at the position of the bead portion 4. In this case, the tread rubber 11 may extend up to the tire side portion and be used in place of the side rubber 12 so long as the object of the present invention is not lost. Further, the inner liner 10 is not used in a tire having a tube. In FIG. 1, the numeral 14 represents a cloth chafer formed of tire cord fabric or woven cloth.

In the present invention, the carcass 6 is arranged such that, when a tire is assembled on a rim, the turn-up portion 6' of the carcass ply is extended up to a portion somewhat higher than the upper end of the rim flange (not shown) and is substantially terminated in the bead portion 4. A hard rubber having a remarkably high hardness of 75°–97° (Shore A scale, hereinafter hardness is shown by Shore A scale) is preferably used as a rubber filler 7, and the rubber filler 7 extends into the side portion 3 or is extended upwardly beyond the maximum width position 0 of the carcass under such a condition that the vertical distance $h_1$ of the upper end of the rubber filler 7 from a base line B—B, which passes through the center g of the bead wire and is parallel to the rotation axis of the tire, to the upper end of the rubber filler 7 lies within the range of 40–120% of the vertical distance $h_o$ of the maximum width position O of the tire from the above described base line B—B.

A rubber chafer 13 which extends along its contact portion with a rim flange when a tire is assembled, that is, extends upwardly along the bead heel 16 and the turn-up portion 6' of the carcass ply, is arranged such that the upper end q of the rubber chafer 13 is located in the vicinity of the turn-up end p of the carcass ply, preferably is somewhat upwardly extended beyond the point p. A side rubber 12, which extends along the carcass 6 and rubber filler 7, is arranged such that the lower end r of the side rubber 12 extends beyond the turn-up end p and is located at the outer side of the turn-up portion 6'. As shown in FIG. 1, the lower portion of the side rubber 12 is embraced in the form of a wedge between the ruuber filler 7, the turn-up portion 6' and the rubber chafer 13 to form a covering for the side portion.

The rubber chafer 13 has a hardness within the range of 60°–80°, and the hardness is preferred to be equal to or slightly lower than the hardness of the rubber filler 7. On the contrary, the hardness of the side rubber 12 must be lower than the hardnesses of the rubber filler 7 and rubber chafer 13, and is within the range of 30°–60°.

Further, the end p of the turn-up portion 6' can be protected by a U-shaped cover rubber 17. The cover rubber 17 is made of flexible thin sheet rubber or squeeze rubber having a hardness of 30°–50°, which is the same kind as the rubber for carcass ply.

A cloth chafer 14 arranged around the bead toe 15 in FIG. 1 may be replaced by a rubber chafer 13. In this case, the rubber chafer 13 is extended to the area at the inner side of the bead.

In general, when a tire is assembled on a rim and used, if the side portion and bead portion of the tire are repeatedly deformed due to the load applied thereto during the use, the turn-up end of the carcass ply is apt to become a nucleus for the separation and crack of the covering for the side portion. In the present invention, the turn-up end of carcass ply is protected by an arrangement, wherein a rigid rubber chafer 13 is arranged on the rim flange side of the turn-up end of the carcass ply, and a rigid rubber filler 7, which serves to suppress excess deformation, is arranged on the opposite side of the rigid rubber chafer 13 with respect to the turn-up portion 6'. A flexible side rubber, which extends in the form of a wedge between the rigid rubber chafer 13 and the rigid rubber filler 7, is embraced between the turn-up portion 6' of the carcass and the rigid rubber chafer 13. With this arrangement, shear strain due to the deformation of the turn-up end, which is apt to be concentrated thereto, is absorbed in the side rubber surrounding the turn-up end, and therefore the load acting upon the turn-up end can be noticeably decreased without the use of a particular additional reinforcing cord layer.

Moreover, the sandwiched structure formed by embracing the flexible side rubber between the rigid rubber filler and the rigid rubber chafer in the present invention provides high flexural stiffness to the bead portion, and therefore the bead portion can be made into a thin gauge as a whole, and is effective in itself for suppressing the shear strain.

Figure 2:
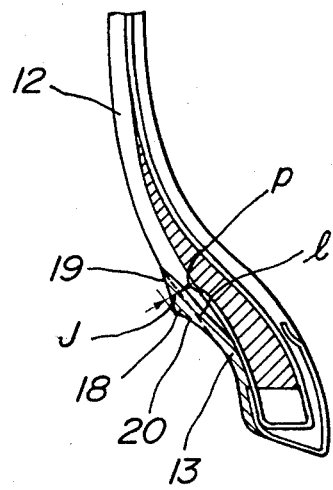
FIG. 2 is a cross-sectional view of the essential part of a second embodiment of the tire of the present invention.

FIG. 2 is a cross-sectional view of a bead portion of a second embodiment of the tire of the present invention.

In the tire illustrated in FIG. 2, the bead portion is provided at the vicinity of the turn-up tip p of a carcass ply with an annular projection 18 which extends substantially continuously in the peripheral direction of the tire. This annular projection 18 is located somewhat above the rim flange when the tire is assembled on a rim. The maximum gauge J of the annular projection 18 with respect to a broken line l, which indicates usually the outer profile of the bead portion, must be varied depending upon the tire size, but is preferably 2–6 mm. Of course, an annular projection having a maximum gauge of less 2 mm may also be effective. Slopes 19 and 20 extend from the top of the annular projection 18 towards the base thereof in the form of, in their cross-section, a straight line or an arc having a center in the outside portion of the bead portion. The annular projection 18 can be formed by projecting the rubber chafer 13 alone as illustrated in FIG. 2 or in combination with the side rubber 12.

In the tire illustrated in FIG. 2, when a lateral force acts on a tire while running on a curved road or a tire is obliged to be driven under a low internal pressure due to error, the annular projection 18 contacts with the upper end portion of the rim flange to prevent the bead portion from excessively falling and further to suppress effectively an adverse influence of harmful stress upon the turn-up end p in combination with the action of the side rubber which extends in the form of a wedge at the vicinity of the bead portion.

Tires having the above described structures according to the present invention were compared with a similar conventional tire in the performance.

The dimensions of sample tires are shown in the following Table 1. The test condition and the obtained result are shown in the following Table 2.

TABLE 1

| Tire | | A (Present invention, FIG. 1) | B (Present invention, FIG. 2) | C (Comparative tire) |
|---|---|---|---|---|
| Size | | 165SR 13 | 165SR 13 | 165SR 13 |
| Carcass 6 | | 1,500d/2 polyester, 1 ply | 1,500d/2 polyester, 1 ply | 1,500d/2 polyester, 1 ply |
| Belt layer | | 2 steel cord layers, crossed at an inclined angle of 20° | 2 steel cord layers, crossed at an inclined angle of 20° | 2 steel cord layers, crossed at an inclined angle of 20° |
| Height of turn-up portion 6' of carcass ply | | 22 mm | 22 mm | 22 mm |
| Rubber filler 7 | Hardness (Shore A) | 90° | 90° | 90° |
| | Height $h_1$ ($h_1/h_0 \times 100$) | 55 mm (80%) | 55 mm (80%) | 55 mm (80%) |
| Side rubber 12 | Hardness (Shore A) | 44° | 44° | 44° |
| | Height of the lower end r from the base line | 15 mm | 15 mm | 15 mm |
| Rubber chafer 13 | Hardness (Shore A) | 70° | 70° | 70° |
| | Height of the upper end q | 24 mm | 24 mm | 24 mm |
| Arrangement of side rubber, rubber filler and rubber chafer | | side rubber is sandwiched between rubber filler and turn-up portion and rubber chafer | side rubber is sandwiched between turn-up portion and rubber chafer | rubber chafer is sandwiched between turn-up portion and side rubber |
| Annular projection 18 | | none | present (gauge J = 4 mm) | none |

TABLE 2

| Tire | A | B | C |
|---|---|---|---|
| Test | durability test on drum | | |
| Rim | 4½J | | |
| Drum | diameter: 1.7 m made of steel having a smooth surface | | |
| Speed | 60 km/h | | |
| Temperature | room temperature | | |
| Internal pressure | 3.0 kg/cm² | | |
| Load | 770 kg | | |
| Test result | no change after running over 30,000 km | no change after running over 30,000 km | separation occurred at the turn-up end of carcass ply after running over 12,000 km |

In the comparison test, a sample tire was assembled on a rim of 4½J, and driven at a speed of 60 km/hr on a drum, which had a smooth surface and a diameter of 1.7 m and was kept at room temperature, under an internal pressure of 3.0 kg/cm² and a load of 770 kg, and whether or not failure occurred in the bead portion was observed.

In the sample tire C, cracks were formed in the side rubber 12 at the position corresponding to the turn-up end p of carcass ply after running over 12,000 km, and separation occurred at the turn-up end p. On the contrary, in sample tires A and B according to the present invention, no change was observed even after running over 30,000 km.

As described above, according to the present invention, early failures, such as separation, crack and the like, in the bead portion of pneumatic radial tire can be advantageously prevented without the use of any additional reinforcement in the turn-up end portion of carcass ply.

What is claimed is:

1. A pneumatic radial tire for passenger cars comprising; a cylindrical tread portion, side portions located at both sides of the tread portion and extending inwardly in the radial direction, bead portions located at radially inner edge portions of the side portions and having a bead wire; said tread, side and bead portions being reinforced with a carcass comprising at least one radially arranged fiber cord layer and turned up around the bead wire from the inside to the outside; the turn-up end of the carcass being substantially terminated in the bead portion; said bead portion being reinforced by arranging a tapered hard rubber filler having a Shore A hardness of 75°–97° between the carcass and the turn-up portion thereof to extend from the upper portion of the bead wire towards the side portion beyond the turn-up end of the carcass; a soft side rubber having a Shore A hardness of 30°–60° located on each outer side of the carcass adjacent thereto and extending from the side portion to a position beyond the end of the turn-up portion of the carcass in the bead portion, and a hard rubber chafer having a Shore A hardness of 60°–80° located on a surface of each bead which at least contacts a rim flange when the tire is mounted on a rim, the upper end of said hard rubber chafer extending towards the side portion to a position beyond the end of the turn-up portion of the carcass, the radially innermost portion of said soft side rubber directly sandwiched between and in contact with the upper portion of said rubber chafer and said turn-up portion of the carcass and the end of the turn-up portion of the carcass sandwiched directly between and in contact with said soft side rubber and said hard rubber filler.

2. A tire according to claim 1, wherein the hard rubber chafer has an annular stress-relaxing projection projected outwardly from the bead portion at the vicinity of the turn-up end of the carcass.

* * * * *